(12) United States Patent
Schmidt et al.

(10) Patent No.: US 9,169,363 B2
(45) Date of Patent: Oct. 27, 2015

(54) PSEUDOTHERMOPLASTIC, SELF-CROSSLINKING COMPOSITES

(71) Applicants: Friedrich Georg Schmidt, Haltern am See (DE); Stefan Hilf, Rodenbach (DE)

(72) Inventors: Friedrich Georg Schmidt, Haltern am See (DE); Stefan Hilf, Rodenbach (DE)

(73) Assignee: EVONIK DEGUSSA GmbH, Essen (DE)

( * ) Notice: Subject to any disclaimer, the term of this patent is extended or adjusted under 35 U.S.C. 154(b) by 0 days.

(21) Appl. No.: 14/360,442

(22) PCT Filed: Nov. 6, 2012

(86) PCT No.: PCT/EP2012/071947
§ 371 (c)(1),
(2) Date: May 23, 2014

(87) PCT Pub. No.: WO2013/079286
PCT Pub. Date: Jun. 6, 2013

(65) Prior Publication Data
US 2014/0323001 A1 Oct. 30, 2014

(30) Foreign Application Priority Data
Nov. 28, 2011 (DE) .................... 10 2011 087 226

(51) Int. Cl.
*C08J 3/24* (2006.01)
*C08J 5/04* (2006.01)
*C08J 5/24* (2006.01)
*B29B 13/00* (2006.01)
*C08L 33/08* (2006.01)
*C08F 2/60* (2006.01)

(52) U.S. Cl.
CPC . *C08J 3/24* (2013.01); *B29B 13/00* (2013.01); *C08J 5/04* (2013.01); *C08J 5/24* (2013.01); *Y10T 442/20* (2013.01)

(58) Field of Classification Search
CPC .................. C08J 3/24; C08J 5/04; C08J 5/24; C08L 33/08; C08F 2/60
USPC ............ 524/518, 560, 577; 525/330.3, 333.6, 525/210; 442/59; 427/290; 264/257
See application file for complete search history.

(56) References Cited

U.S. PATENT DOCUMENTS

| | | | |
|---|---|---|---|
| 8,916,635 B2 * | 12/2014 | Schmidt et al. ................ | 524/421 |
| 2011/0190458 A1 | 8/2011 | Broekhuis et al. | |
| 2012/0289657 A1 | 11/2012 | Hilf et al. | |
| 2012/0309895 A1* | 12/2012 | Schmidt et al. ................ | 524/599 |
| 2013/0172480 A1 | 7/2013 | Schmidt et al. | |
| 2013/0303678 A1 | 11/2013 | Hilf et al. | |
| 2013/0323993 A1 | 12/2013 | Schmitt et al. | |
| 2014/0121327 A1 | 5/2014 | Schmidt et al. | |

FOREIGN PATENT DOCUMENTS

| | | |
|---|---|---|
| EP | 2 166 030 | 3/2010 |
| WO | 2011 101176 | 8/2011 |
| WO | WO 2011101176 A1 * | 8/2011 |
| WO | 2011 146577 | 11/2011 |
| WO | WO 2011146577 A2 * | 11/2011 |

OTHER PUBLICATIONS

International Search Report Issued Feb. 8, 2013 in PCT/EP12/071947 Filed Nov. 6, 2012.
U.S. Appl. No. 14/234,936, filed Jan. 24, 2014, Schmitt, et al.
U.S. Appl. No. 14/363,055, filed Jun. 5, 2014, Schmidt, et al.

* cited by examiner

*Primary Examiner* — Michael M Bernshteyn
(74) *Attorney, Agent, or Firm* — Oblon, McClelland, Maier & Neustadt, L.L.P.

(57) ABSTRACT

In the present process, reversibly crosslinking composites or storage-stable prepregs are produced by means of a hetero Diels-Alder reactions (HDA,) for example of PMMA polymers. At slightly elevated temperature, these prepregs can be reversibly decrosslinked again by a retro hetero Diels-Alder reaction so that they become moldable. The back-reaction to products which are again crosslinked or high molecular weight then takes place at room temperature.

20 Claims, No Drawings

PSEUDOTHERMOPLASTIC, SELF-CROSSLINKING COMPOSITES

CROSS REFERENCE TO RELATED APPLICATION

This application is a 371 of PCT/EP2012/071947, filed on Nov. 6, 2012, and claims priority to German Patent Application No. 10 2011 087 226.4, filed on Nov. 28, 2011.

FIELD OF INVENTION

The invention relates to a process for producing storage-stable prepregs and molded articles produced therefrom (composite components).

In the present process, reversibly crosslinking composites or storage-stable prepregs are produced by means of a hetero Diels-Alder reactions (HDA), for example of PMMA polymers. At slightly elevated temperature, these prepregs can be reversible decrosslinked again by a retro hetero Diels-Alder reaction so that they become moldable. The back-reaction to products which are again crosslinked or high molecular weight then takes place at room temperature.

PRIOR ART

Fiber-reinforced materials in the form of prepregs are already used in many industrial applications because of their convenience of handling and the increased efficiency in processing compared to the alternative wet lay-up technology.

As well as faster cycle times and higher storage-stability, industrial users of such systems also demand the possibility of cutting the prepregs to shape at room temperature as well, without the cutting tools becoming soiled with the often sticky matrix material during automated cutting to shape and lay-up of the individual prepreg layers.

Various molding processes, such as for example the reaction transfer molding (RTM) process comprise the introduction of the reinforcing fibers into a mold, closure of the mold, introduction of the crosslinkable resin formulation into the mold and the subsequent crosslinking of the resin, typically by application of heat. However, such a process is laborious and the prepregs are not storable as such.

As well as polyesters, vinyl esters and epoxy systems, there are a number of specialized resins in the field of the crosslinking matrix systems. These also include polyurethane resins, which because of their toughness, damage tolerance and strength are in particular used for producing composite profiles by pultrusion processes. As a disadvantage, the toxicity of the isocyanates used is commonly mentioned. However, the toxicity of epoxy systems and the curing agent components used there must also be regarded as critical. This applies in particular for known sensitization reactions and allergies.

In addition, most matrix materials for producing prepregs for composites have the disadvantage that during application onto the fiber material they are present either in solid form, e.g. as powder, or as highly viscous liquid or melt. In both cases, there is only slight impregnation of the fiber material with the matrix material, which in turn can result in non-optimal stability of the prepreg or of the composite component.

Prepregs and composites produced therefrom on the basis of epoxy systems are for example described in WO 98/50211, EP 309 221, EP 297 674, WO 89/04335 and U.S. Pat. No. 4,377,657. In WO 2006/043019, a process for producing prepregs on the basis of epoxy resin polyurethane powders is described. Furthermore, prepregs based on thermoplastics in powder form as the matrix are known.

In WO 99/64216, prepregs and composites and a method for producing them are described, wherein emulsions with polymer particles so small that individual fiber coating is enabled are used. The polymers of the particles have a viscosity of at least 5000 centipoise and are either thermoplastics or crosslinking polyurethane polymers.

In EP 0590702, powder impregnations for producing prepregs are described, wherein the powder consists of a mixture of a thermoplastic and a reactive monomer or prepolymers. WO 2005/091715 likewise describes the use of thermoplastics for producing prepregs.

Prepregs which have been made by use of Diels-Alder reactions and potentially activatable retro-Diels-Alder reactions, are also known. In A. M. Peterson et al. (ACS Applied Materials & Interfaces (2009), 1(5), 992-5), corresponding groups in epoxy systems are described.

Through this modification, self-healing properties of the components are obtained. Analogous systems which are not based on an epoxy matrix are also found inter alia in J. S. Park et al. (Composite Science and Technology (2010), 70(15), 2154-9) or in A. M. Peterson et al. (ACS Applied Materials & Interfaces (2010), 2(4), 1141-9). However, none of the systems cited enables subsequent modification of the composites going beyond self-healing. Under the possible conditions, the classical Diels-Alder reaction can only be run backwards to an inadequate extent, so that here only slight effects, such as may be sufficient for a self-healing of damaged components, are possible.

In EP 2 174 975 and in EP 2 346 935, composite materials, usable as laminate with bis-maleimide and furan groups respectively, which can be thermally recycled, are described. It is readily apparent to those skilled in the art that such a system can only be activated again, i.e. at least to a major proportion crosslinked again, at relatively high temperatures. However, at such temperatures further side-reactions rapidly occur, so that the mechanism—as described—is suitable only for recycling, but not for modification of the composites.

None of the systems described can be shaped again in a simple manner after the processing to the composite and the final curing associated therewith. Further processing of a system once cured is only still possible by cutting to shape or other irreversible processes.

Purpose

Against the background of the state of the art, the purpose of the present invention was to provide a novel prepreg technology which enables a simple process for producing prepreg systems which can be handled without problems.

In particular, a purpose of the present invention was to provide a process for producing prepregs which have a markedly extended storage stability and/or processing time (molding time, pot life). In addition, the handling of the prepreg should be improved or at least comparable relative to the state of the art.

In addition, a process for producing composite components whereby the composites after finishing should be further modifiable or even recyclable should be provided.

Solution

The problems are solved by means of novel kits for producing composite semifinished products. These novel kits comprise A) a fibrous carrier,
B) a first reactive component, which has at least two dienophilic double bonds, the dienophilic double bonds are carbon-sulfur double bonds, and
C) a second reactive component, which has at least two diene functionalities.

Here, at least one of the components B or C contains more than two of the respective functionalities. By means of said functionalities, the first and the second reactive component can be crosslinked with one another by means of a Diels-Alder or a hetero Diels-Alder reaction.

In the context of this invention, the term composite semifinished products is used synonymously with the terms prepreg and organic sheet. As a rule, a prepreg is a precursor for thermosetting composite components. An organic sheet is normally a corresponding precursor for thermoplastic composite components.

The dienophilic double bonds are in particular double bonds around groups with the structure

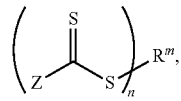

wherein Z is a 2-pyridyl group, a phosphoryl group or a sulfonyl group, $R^m$ is a multivalent organic group or a polymer and n a number between 2 and 20.

In a particular embodiment of the invention the components A and/or B are one or more polymers. These polymers are preferably polyacrylates, polymethacrylates, polystyrenes, copolymers of acrylates, methacrylates and/or styrenes, polyacrylonitrile, polyethers, polyesters, polylactic acids, polyamides, polyester amides, polyurethanes, polycarbonates, amorphous or partially crystalline poly-α-olefins, EPDM, EPM, hydrogenated or non-hydrogenated polybutadienes, ABS, SBR, polysiloxanes and/or block, comb or star copolymers or hyperbranched copolymers of these polymers.

The reactive compositions usable according to the invention are harmless to the environment, inexpensive, have good mechanical properties, can be processed easily and after curing are distinguished by good weather resistance and a balanced relationship between hardness and flexibility.

The principle is not limited to the said polymers, but can also be extended as platform technology to other polymer types. Thus for example from RAFT polymerization synthesized difunctional polymer building blocks of the type B or C and multifunctional crosslinkers of the corresponding complementary type C or B respectively at room temperature, crosslinked systems can be obtained, which on attainment of a decrosslinking temperature adjustable through the selection of the components can be reversibly cleaved again into their original components.

A major advantage of the present invention inter alia is that by means of the curing mechanisms used according to the invention, compared to the state of the art, i.e. compared to established composites, a markedly greater number of raw materials or raw material combinations are usable. As a result, novel composite materials with entirely novel property profiles are available.

In addition to the components A, B and C, the composite semifinished products can also contain other additives. Thus for example light stabilizers such as for example sterically hindered amines, or other auxiliary agents such as were for example described in EP 669 353, can be added in a total quantity of 0.05 to 5 wt. %. Fillers and pigments such as for example titanium dioxide can be added in a quantity up to 30 wt. % of the total composition.

In addition, for the production of the reactive polyurethane compositions according to the invention, additives such as leveling agents, e.g. polysilicones or anchoring agents, e.g. acrylate-based, can be added.

Carriers A

Said fibrous carriers A) are in particular carriers which consist mainly of glass, carbon, plastics, such as polyamide (aramid) or polyester, natural fibers, or mineral fiber materials such as basalt fibers or ceramic fibers. The fibers here are present as textile surface structures of fleece, knitted goods, knitted and crocheted goods, non-meshed skeins such as fabrics, nonwovens or braids, or as long fiber or short fiber materials.

In detail, the following description applies: the fibrous carrier of the present invention consists of fibrous material (also commonly called reinforcing fibers). In general, any material of which the fibers consist is suitable, however fibrous material of glass, carbon, plastics, such as for example polyamide (aramid) or polyester, natural fibers or mineral fiber materials such as basalt fibers or ceramic fibers (oxide fibers based on aluminum oxides and/or silicon oxides) is preferably used. Mixtures of fiber types, such as for example fabric combinations of aramid and glass fibers, or carbon and glass fibers, can also be used. Likewise, hybrid composite components can be produced with prepregs made from different fibrous carriers.

Mainly because of their relatively low price, glass fibers are the most commonly used fiber types. In principle, all types of glass-based reinforcing fibers are suitable here (E-glass, S-glass, R-glass, M-glass, C-glass, ECR-glass, D-glass, AR-glass, or hollow glass fibers). In general, carbon fibers are used in high performance composite materials, where the lower density relative to glass fibers simultaneously with higher strength is an important factor. Carbon fibers (also carbon fibers) are industrially produced fibers from carbon-containing starting materials, which are converted by pyrolysis into carbon of graphite-like structure. The distinction is made between isotropic and anisotropic types: isotropic fibers have only low strength and little industrial importance, anisotropic fibers display high strength and rigidity simultaneously with low elongation at break. Described as natural fibers here are all textile fibers and fiber materials which are obtained from plant and animal material (e.g. wood, cellulose, cotton, hemp, jute, flax, sisal and bamboo fibers). Similarly to carbon fibers, aramid fibers have a negative coefficient of thermal expansion, and thus become shorter on heating. Their specific strength and their elastic modulus is markedly lower than that of carbon fibers. In combination with the positive coefficients of expansion of the matrix resin, highly dimensionally stable components can be manufactured. Compared to carbon fiber-reinforced plastics, the compressive strength of aramid fiber composite materials is markedly lower. Known brand names for aramid fibers are Nomex® and Kevlar® from DuPont, or Teijinconex®, Twaron® and Technora® from Teijin. Carriers made from glass fibers, carbon fibers, aramid fibers or ceramic fibers are particularly suitable and preferred. The fibrous material is a textile surface structure. Textile surface structures of fleece, also so-called knitted goods, such as knitted and crocheted goods, but also non-meshed skeins such as fabrics, nonwovens or braids, are suitable. Apart from this, the distinction is made between long fiber or short fiber materials as carriers. Also suitable according to the invention are rovings and yarns. All said materials are suitable as fibrous carriers in the context of the invention. An overview of reinforcing fibers is contained in "Composites Technologies, Paolo Ermanni (Version 4), Lecture Text ETH Zürich, August 2007, Chapter 7".

Component B

Component B is a compound, optionally a polymer, with at least two dienophilic groups with a carbon-sulfur double bond. In general, the compound A is of the following form:

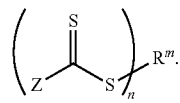

Z is an electron-withdrawing group, $R^m$ a multivalent organic group or a polymer and n a number between 2 and 20. In the selection of the group and the accompanying diene it is only important that the hetero Diels-Alder reaction is activatable at a temperature, in the case of the present invention that of the crosslinking temperature $T_1$, below 80° C., is reversible again by means of a retro hetero Diels-Alder reaction at a higher temperature, which is the decrosslinking temperature $T_2$, and that this higher temperature lies as far as possible below the decomposition temperature of the components contained in the powder material.

Particularly preferably, the dienophile in this case is a dithioester or a trithiocarbonate.

In a preferred embodiment, the group Z is a 2-pyridyl group, a phosphoryl group or a sulfonyl group. Also possible are cyano or trifluoromethyl groups and any other group Z which very strongly decreases the electron density of the C=S double bond and thereby allows a rapid Diels-Alder reaction.

An exact description of the dienophilic groups for this embodiment of a (retro) hetero Diels-Alder reaction is to be found in the German patent application 102010002987.9 (or the international patent application PCT/EP2011/050043). In this document, the feasibility of the reaction is also demonstrated on the basis of practical examples.

Component C

Component C is a diene. This diene has the general formula:

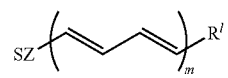

Here SZ is a rather electron-repelling group, but it can also be simply hydrogen or a simple alkyl residue. $R^l$ is a multivalent organic group or a polymer and m is a number between 2 and 20. The carbon atoms of the double bonds can moreover have further residues.

Known groups which are particularly suitable as the diene are for example furfuryl residues, adducts of sorbyl alcohol or cyclopentadienyl residues.

Process

Furthermore, a novel process for producing composite semifinished articles and further processing thereof to molded parts is part of the present invention. This process is characterized by the following process steps:

I. optional molding of the carrier A),
II. production of a reactive composition consisting of the components B) and C),
III. direct impregnation of the fibrous carrier A) with the composition from II.
IV. curing of the composition at a crosslinking temperature $T_1$,
V. heating to a decrosslinking temperature $T_2$,
VI. molding and
VII. curing of the composition at the crosslinking temperature The crosslinking temperature $T_1$ of the crosslinking in the process steps IV and VII preferably lies between 0 and 60° C., particularly preferably between 10 and 40° C. and quite particularly preferably at room temperature. The decrosslinking temperature $T_2$ in process step V, at which these crosslinking sites are at least 50%, preferably at least 70%, released again by means of a retro Diels-Alder or a retro hetero Diels-Alder reaction, is preferably a temperature which lies between 50 and 150° C., particularly preferably between 70 and 120° C. above the crosslinking temperature $T_1$.

Process step II is particularly preferably performed at a temperature $T_3$ which lies at least 40° C. above the crosslinking temperature $T_1$. Process step IV is effected by cooling to the crosslinking temperature $T_1$.

Process step III, the impregnation, is effected by impregnation of the fibers, fabrics or nonwovens with the formulation produced in process step II. The impregnation is preferably effected at the same temperature as process step II. This application and impregnation of the fabric/nonwoven in process step III is in particular effected in the low viscosity state of the composition from process step II. Depending on the composition used here, the particular and major advantage can be the extremely reduced viscosity of the non-coupled low molecular weight building blocks present adjacent to one another, in comparison to thermoplastics.

Alternatively, the impregnation can also be effected by means of a solution. In this case, after the impregnation, drying is effected to remove the solvent in a process step IIIa. All solvents suitable for the composition are suitable as solvents, such as for example aromatics such as toluene, acetates such as propyl acetate, ketones such as acetone, aliphatics such as heptane, alcohols such as propanol or chlorinated aliphatics such as chloroform.

The use of the composition according to the invention made from the components B and C results in very good impregnation of the fibrous carrier A, owing to the fact that the liquid composition made from components B and C wets the carrier A very well, whereby at a sufficiently high temperature during the wetting a premature crosslinking reaction is avoided. Moreover, the process steps of milling and screening into individual particle size fractions, such as are often necessary with state of the art composite materials, become unnecessary, so that a higher yield of impregnated fibrous carrier can be achieved.

After process step II, the composite semifinished products can be molded, e.g. by pressure in a press, preferably at a temperature which corresponds to the decrosslinking temperature $T_2$, but which obligatorily deviates from this by 20° C. at most. Particularly suitable for this is the use of a belt press for the production of planar "organo sheets". Here the crosslinking of process step IV preferably takes place within the tool used for the pressing. The stripping is preferably effected later from the tool cooled to temperature $T_1$.

The production of a composite semifinished product which is again flexibilizable or deformable is completed in process step IV by cooling to the crosslinking temperature $T_1$, preferably to room temperature, at which the matrix passes into the covalently crosslinked state. During the cooling, the matrix crosslinks not only within the composite semifinished product, but optimally also over the layer boundaries between several prepreg layers previously laid together. Thus the crosslinking takes place within the whole composite component, even when this has been assembled from several impregnated parts.

In a particularly preferred embodiment of the invention, the crosslinking in process step IV takes place within 2 mins after the mixing of the components B and C in process step II at room temperature. In this embodiment, process step III is particularly preferably performed at the latest 30 secs after process step II. In the same embodiment, the crosslinking in process step VII takes place spontaneously during the cooling from the temperature from process steps V and VI to the crosslinking temperature $T_1$, in particular to room temperature.

The covalent crosslinking taking place at room temperature presents the advantage that for example no "creep" takes place under mechanical loading, as is more commonly to be observed with thermoplastic, even partly crystalline composites.

Optionally, the composite semifinished product can be premolded between the process steps III and IV by means of pressing, e.g. under pressure or also by application of vacuum.

After the production of a composite semifinished products which is flexibilizable/deformable again in the process steps I to IV, reactivation of the composite semifinished products is optionally effected, for renewed molding in the process steps V to VII.

A particular advantage of the present invention is that the process steps V to VII can be repeated one or more times. Hence the composite semifinished products produced according to the invention are characterized not only in that they can be newly shaped several times, but also in that the composite semifinished products or the finished molded parts produced therefrom can be recycled.

The molding in process step VI can be effected by means of various molding processes. In pultrusion, in particular thermoplastic pultrusion, the impregnated semifinished product is drawn through an array of different nozzles. During this, the cross-section is gradually decreased to the geometry of the desired profile.

In duromer or wet winding technique, the impregnated semifinished product is wound onto a mandrel. With this process, geodetic or concave molded components can in particular be created. By suitable temperature control during the winding process, particularly good adhesion between the individual fibers can be created.

Other geometries, in particular large-surface area workpieces, can be produced by tape laying. In tape laying, impregnated semifinished products are laid down as unidirectional tapes with a laying head, as a rule from supply spools, onto flat or shaped production means. In addition, such tools are equipped inter alia with a cutting device.

The thermoforming of organic sheets is a pressure process. Various modifications of this are known. In stamp-forming with metal stamps, two tool halves of metal are used as a press. In this modification, both tool sides are molding. Particularly for small production runs, the more flexibly applicable molding with elastomer block is used. In this modification, one tool side has a flexible, exchangeable elastomer block, while the other tool side is molding. One modification for this is a silicone stamp. In hydroforming, the first tool side has, instead of the elastomer block, a chamber filled with a liquid, e.g. a hydraulic oil, and closed with an elastic membrane. In diaphragm molding, the non-molding tool side is a highly elastic membrane which during the actual pressing process, by means of introduced gas or liquid and pressure thereby created, has a molding action after the closure of the tool.

Further examples of molding processes are other winding techniques and roller molding processes, in particular roll forming, bending forming or the flow press process. All processes mentioned by way of example are known to those skilled in the art and easy to apply to the semifinished products according to the invention.

The first molding can also be effected by means of a modification of the process according to the invention by quick-temp molding or direct impregnation. In these processes, impregnation and the first molding take place in the same tool. Both processes otherwise resemble the described thermoforming of organic sheets.

In addition, molded articles can be produced in the process according to the invention in an additional process step VIII from the molded composite semifinished product by means of further pressing, cutting to shape, milling, polishing and/or painting or coating. Molded articles can also be assembled from several composite semifinished products, e.g. by gluing or stitching together.

This process step VIII can be effected after process step IV or after a process step VII. Irrespective of when process step VIII is performed, further cycles of the process steps V to VII can follow thereafter.

In a process step IX, the composite semifinished product according to the invention or a molded article produced therefrom can be recycled at a temperature $T_4$. This temperature $T_4$ here is at least as high as the decrosslinking temperature $T_2$. Process step IX can be effected after the process steps IV, VII or VIII, depending in each case on in which process stage recycling is to take place.

The composite semifinished products according to the invention or the molded articles produced according to the invention can be used in a variety of ways. In particular, these can be used for producing composites in boat and ship-building, in aerospace technology, in automobile manufacture, for two-wheeled vehicles, preferably motor cycles or bicycles, and in the automotive, construction, medical engineering, sport, electrical or electronics industry fields, and power generation units such as for rotor blades in wind energy plants.

EXAMPLES

In the preliminary stages 1 to 5, compounds with furfuryl residues were synthesized.

Preliminary Stage 1: Tri-isophorone-trifurfuryl (T-IPDI-Fu) (3)

For the synthesis of tri-isophorone-trifurfuryl (T-IPDI-Fu), furfuryl alcohol (2) are reacted with trimeric isophorone diisocyanate (T-IPDI) (1) in acetone in the presence of DBTL (dibutyltin laurate) as catalyst.

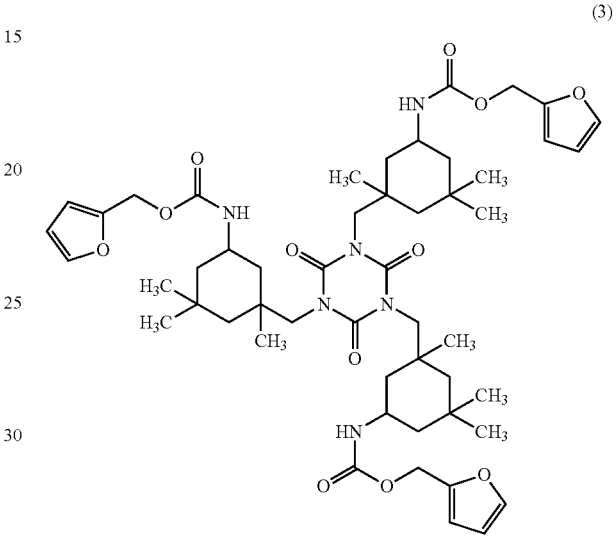

(3)

For the synthesis, 0.490 mol (355.78 g) of T-IPDI are dissolved in 500 g acetone in a 2000 ml three-necked flask and, after addition of 0.01 wt. % dibutyltin laurate (DBTL) heated to 60° C. Next, 1.478 mol (145.02 g) of furfuryl alcohol are added dropwise to the acetone solution within 30 mins via a dropping funnel. The NCO content of the reaction solution at the start of the synthesis is 6.07%.

After 2.5 hrs reaction times at 60° C., the NCO content of the reaction solution is determined in order to monitor the progress of the reaction. It lies at ca. 0.35%. After a further 2.25 hrs, the NCO content is again determined. It now lies at 0.14%. The reaction is ended at this NCO content. The solvent is removed in the vacuum drying cabinet overnight at 25° C. A crystalline, light yellowish solid with a melting point of $T_m=123°$ C. remains. The unambiguous characterization of the product was effected by infrared spectroscopy and by $^1$H NMR and $^{13}$C NMR spectroscopy.

Preliminary Stage 2: Tri-hexamethylene-trifurfuryl (T-HDI-Fu)

In the second preliminary stage, trimeric hexamethylene diisocyanate (T-HDI) (4) is reacted with furfuryl alcohol (5) in a urethane reaction to give tri-hexamethylene-trifurfuryl (T-HDI-Fu) (6). The background for the use of T-HDI is that this crosslinking component provides for more flexibility in the network owing to its long alkyl chains and thus further improves the production of a flexible matrix for the prepreg production.

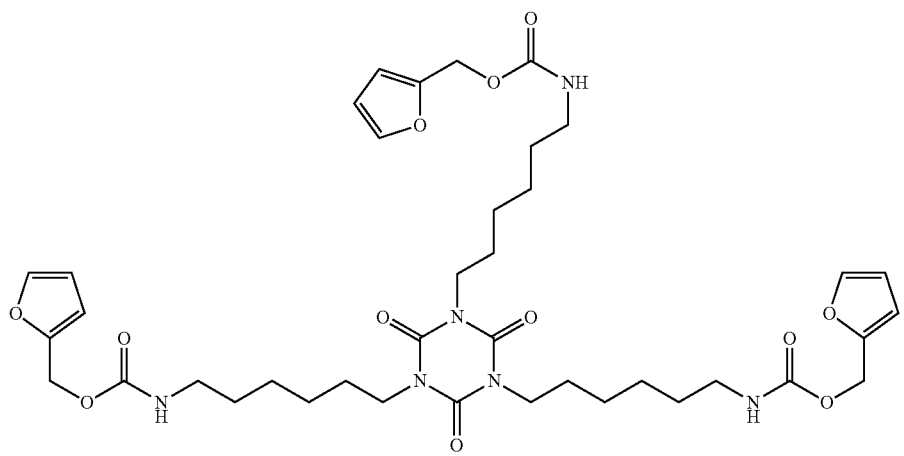

(6)

For the synthesis, 0.574 mol (331.42 g) of the clear, oily-viscous T-HDI are weighed into a 2000 ml three-necked flask, dissolved in 500 g acetone and treated with 0.01 wt. % DBTL catalyst. Next, the solution is heated under reflux at 60° C., during which 1.724 mol (169.0 g) of furfuryl alcohol are added dropwise via a dropping funnel within 60 mins. The NCO content of the reaction solution at the start of the synthesis lies at 7.22%.

In the course of the reaction, after 3.5 hrs reaction time at 60° C., a sample is withdrawn in order to determine the NCO content and the progress of the reaction. The content lies at 0.055%. After a further hour reaction time, the reaction is ended at an NCO content of 0.050%. Next, the solvent and unconverted educt are removed at 100° C. and ca. $5*10^{-1}$ mbar. A light yellowish product, solid at room temperature, remains. The unambiguous characterization of the product was effected by infrared spectroscopy and by $^1$H-NMR- and $^{13}$C-NMR spectroscopy.

Preliminary Stage 3: Fu-IPDI-Voranol (12)

As a third compound, monomeric isophorone diisocyanate (IPDI) (7) in the ratio 3 to 2 with a bifunctional polyetherol (8) in acetone is converted to the intermediate product (9). Next, the still free isocyanate groups of the intermediate product are reacted with furfuryl alcohol (11) in a second reaction step. This molecule is intended to serve for flexibilization and to be used in combination with compound (3) as a matrix component.

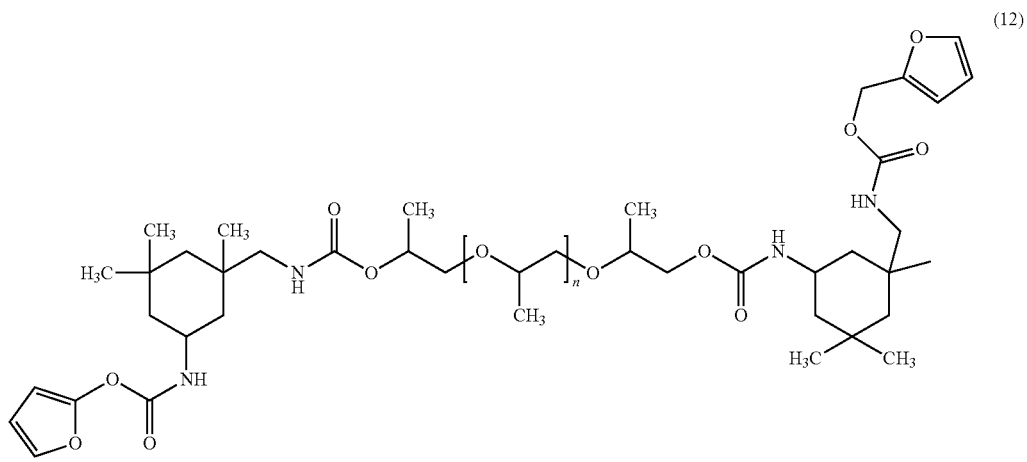

(12)

For the synthesis, 0.321 mol (691.91 g) of Voranol 2000L (8) are weighed into a 2000 ml three-necked flask and dissolved in 500 g acetone. After addition of 0.01 wt. % DBTL catalyst, the solution is heated under reflux at 60° C., during which 0.484 mol (108.96 g) of IPDI are added dropwise to the reaction solution within 45 mins via a dropping funnel. The NCO content of the reaction solution at the start of the synthesis lies at 2.69%.

After 2.5 hrs reaction time at 60° C., the NCO content of the solution is determined. It is 0.91%. Since the theoretically calculated final NCO number lies at 0.897%, the reaction is continued. After a further 1.5 hrs reaction time, the NCO content is determined at 0.896%. whereupon the reaction is ended. The solvents and unreacted educt are distilled off at 100° C. and $5*10^{-1}$ mbar. A clear, brownish viscous oil remains. The unambiguous characterization of the product was effected by infrared spectroscopy and by $^1$H-NMR- and $^{13}$C-NMR spectroscopy.

In the second reaction step, 0.119 mol (678.25 g) of product (10) are weighed into a 2000 ml three-necked flask and dissolved in 700 g acetone. After addition of 0.01 wt. % DBTL, the solution is heated under reflux at 60° C., during which 0.241 mol (23.61 g) of furfuryl alcohol are added dropwise within 60 mins via a dropping funnel. The NCO content of the reaction solution at the start of the synthesis is determined at 0.716%. For reaction monitoring, the NCO content is determined after 1 hr reaction time. This amounts to 0.184%. After a further 4.5 hrs reaction time, the NCO content in solution now is only 0.045%, which indicates almost complete conversion.

For the work-up, the acetone is removed on the rotary evaporator at 60° C. and $5*10^{-1}$ mbar. A yellowish oil remains, which is investigated by $^1$H-NMR and $^{13}$C-NMR and infrared spectroscopy for characterization.

Preliminary Stage 4: Isophorone-difurfuryl (IPDI-Fu)

As the fourth compound, isophorone difurfuryl (IPDI-Fu) (15) is synthesized from isophorone diisocyanate (IPDI) (13) and furfuryl alcohol (14) in acetone. The product can for example be used as a crosslinking component for the reversible DA/rDA reaction of maleate-functionalized poly-(methyl methacrylate) copolymers. Furthermore, it can for example be used in combination with trifunctional crosslinkers, in order to decrease the crosslinking density and thus to increase the flexibility of the matrix.

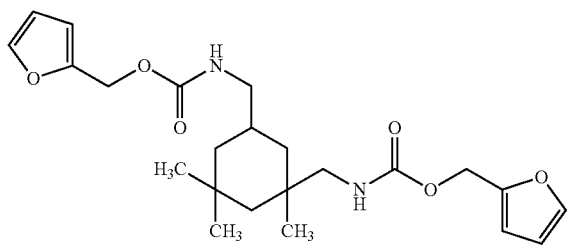

(15)

For the synthesis, 1.092 mol (267.77 g) of IPDI are weighed into a 2000 ml three-necked flask and then dissolved in 300 g acetone. After addition of 0.01 wt. % DBTL, the solution is heated at 60° C., during which 2.377 mol (233.25 g) of furfuryl alcohol are added dropwise within 60 mins. The NCO content of the reaction solution at the start of the synthesis is 12.45%. After 4.5 hrs reaction time, the NCO content is determined, in order to determine the progress of the reaction. It is 0.506%. A further hour later, the reaction is ended at an NCO content of 0.20%. The solvent is removed at 100° C. and $5*10^{-1}$ mbar on the rotary evaporator, whereby a brownish oil very viscous at room temperature remains. The unambiguous characterization of the product was effected by infrared spectroscopy and by $^1$H-NMR- and $^{13}$C-NMR spectroscopy.

Preliminary Stage 5: Tri-methylhexamethylene-difurfuryl (TMDI-Fu)

As the fifth furfuryl-functionalized compound, trimethylhexamethylene-difurfuryl (TMDI-Fu) (18) is produced from 2,2,4-trimethylhexanmethylene diisocyanate (TMDI) (16) and furfuryl alcohol (17) in acetone under reflux.

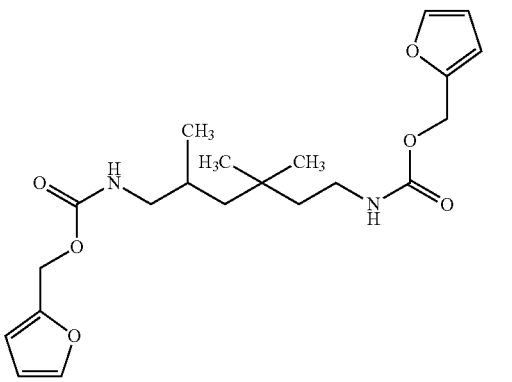

(18)

For the synthesis, 1.210 mol (262.64 g) of TMDI are weighed into a 2000 ml three-necked flask and then dissolved in 500 g acetone. After addition of 0.01 wt. % DBTL, the solution is heated at 60° C., during which 2.470 mol (242.38 g) of furfuryl alcohol are added dropwise within 60 mins. The NCO content of the reaction solution at the start of the synthesis is 10.16%. After 7.5 hrs reaction time, the NCO content is determined in order to determine the progress of the reaction. The content has fallen to 0.43%. After a further 7.5 hrs, the NCO content is determined at 0.30%. After 9.5 hrs, the reaction is ended at an NCO content of 0.08%. The solvent and unreacted furfuryl alcohol are distilled off at 90° C. and $5*10^{-1}$ mbar on the rotary evaporator. A brown oil, liquid to slightly viscous at room temperature, remains. The unambiguous characterization of the product was effected by $^1$H-NMR and $^{13}$C-NMR spectroscopy.

Preliminary Stage 6: Furfuryl-Modified Polymethacrylate

In preliminary stage 6, furfuryl-modified polymethacrylates were synthesized by way of example. For this, a copolymer of butyl methacrylate, methyl methaylate and furfuryl methacrylate was produced by radical solution polymerization and ATRP polymerization.

Alternatively, the desired polymer can be produced by the relevant known techniques of solution polymerization, suspension polymerization or emulsion polymerization, and bulk polymerization and all controlled radical, ionic or coordinative polymerization processes compatible with the desired monomer mixture.

For the further purposes, by way of example two polymers with 6.5 mol. % and 13 mol. % of furfuryl groups were synthesized.

Preliminary Stage 6a Synthesis of Furfuryl-Functionalized Polymethacrylate by Means of ATRP (66-x/2) parts by weight of n-butyl methacrylate (nBA), (34-x/2) parts by weight of methyl methacrylate acrylate, x parts by weight of furfuryl methacrylate 0.5 parts by weight of 1,4-bis(bromoisobutyryloxy)butane, 0.05 parts by weight of copper(I) bromide, 0.006 parts by weight of copper(II) bromide and 0.125 parts by weight of PMDETA are placed in a 1 L three-necked flask with magnetic stirrer, nitrogen feed and reflux condenser. The relevant x value is stated in the respective results in table 3. Acetone is added to the mixture in a quantity such that 500 mL of a 50 vol.% solution are present. Oxygen present is removed by passage of nitrogen for 40 minutes. The mixture is then heated under nitrogen in an oil bath at 60° C. After 4 hrs polymerization, this is interrupted by cooling to room temperature and introduction of atmospheric oxygen. The copper catalyst is removed by electrochemical precipitation onto zinc dust according to the process described in WO 2012/007213. The polymer is obtained by evaporation of the solvent. The composition of the polymer was determined by $^1$H-NMR spectroscopy.

Preliminary Stage 6b Synthesis of Furfuryl-Functionalized Polymethacrylate by Means of Free Radical Solution Polymerization For the synthesis of the copolymer, a mixture of (66-x/2) parts by weight of n-butyl methacylate, (24-x/2) parts of methyl methacrylate and x parts by weight of furfuryl methacrylate is dissolved in 35 parts by weight of xylene in a glass container and treated with 4 parts by weight of mercaptoethanol and degassed by passing nitrogen through it. The relevant x value is stated in the respective results in table 3. In a further container, a 10 wt. % solution of α,α☐'-azobis-(isobutyric acid 2-hydroxyethylamide (3 parts by weight) is prepared. The two feed solutions are metered in a constant ratio over a period of five hours into a glass double-jacket reactor with thermostat temperature-controlled to 110° C. under nitrogen and allowed to polymerize. After completion of the feed, the mixture is heated for a further hour (110° C.) and the polymer solution formed is cooled and discharged. A highly viscous clear polymer solution is obtained, whose composition is determined by 1 H-NMR spectroscopy.

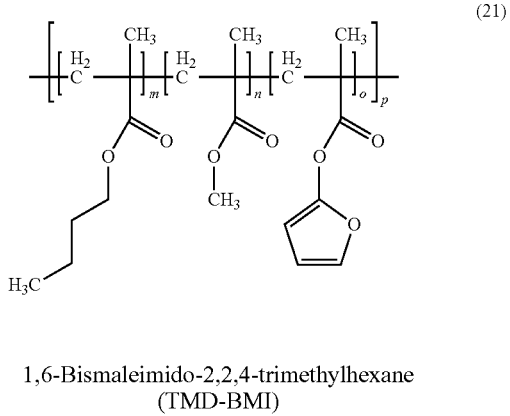

(21)

1,6-Bismaleimido-2,2,4-trimethylhexane
(TMD-BMI)

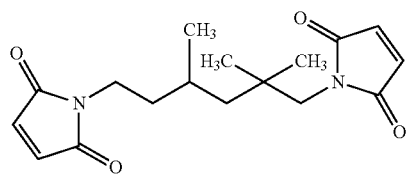

(16)

The TMD-BMI was obtained from Evonik Industries AG/TechnoChemie Dossenheim.

Example

General Procedure for Producing Prepregs and Laminates

The production of the laminates is effected in a heatable hydraulic press. They are built up layerwise from prepregs, with at most between 9 to 15 prepregs being compressed into one ca. 2 mm thick laminate.

As reinforcing material for the fiber composite materials produced in this work, a standard fabric from WELA is used, which is marketed under the trade number 7628. This fabric has a weight per unit area of 202 g/m$^2$ and for better further processing is provided with a size finish and a finish named TF 970 not explained in more detail. The finish provides in general for good fiber-matrix adhesion, in that it enters into the development of covalent bonding between matrix and fabric.

For the production of the prepregs, a ca. 55 wt. % acetone solution consisting of the Diels-Alder educts will be produced, so that they are mixed together in molar equivalent to the DA-functional groups. In this context, Diels-Alder educts mean the dienes from examples 1 to 6 and 1,6-bismaleimido-2,2,4-trimethylhexane as dienophile. The polymer solution is preferably freshly prepared for each impregnation procedure, since the educts crosslink even in solution and at RT after a few hours or days.

The glass fiber fabrics cut to size are now individually soaked in the polymer solution.

Next, the fabrics are dried at 65° C. for 1 hr in the drying cabinet, whereby the DA reaction sets in and the solvent evaporates. The prepreg materials thus forming are storage-stable owing to their completely crosslinked matrix, but still have sufficiently high flexibility to be stored in rolled form.

In the press, the prepregs are pressed above the retro Diels-Alder temperature at ca. 150° C. and 150 bar for 1 hr. At this temperature, the matrices of the individual prepregs become thermoplastic, since the Diels-Alder adduct reversibly cleaves again. On cooling, the matrix crosslinks with renewed formation of the Diels-Alder adduct to give a hard composite material.

Characterization of the Matrices, Prepregs and Laminates

The characterization of the different matrices, prepregs and laminates is performed by mechanical analyses and by differential scanning calorimetry (DSC), which is used for determination of the glass transition temperature of the matrices.

The mechanical analyses show, such as for example in the tensile test, the stress-strain behavior, the E modulus and the maximal tensile strength $\sigma_{max}$ and the maximal elongation at break $\epsilon_{max}$ of the laminate as per DIN EN ISO 527.

Through the three point bending test as per DIN EN 2563, the interlaminar shear strength (ILSS) of the laminate is determined, which also gives information about the fiber-matrix bonding. Thereby, the resistance of the laminate to interlaminar shear stress which acts parallel to the individual layers is determined.

The determination of the Charpy impact resistance of the laminate as per DIN ISO 179-1/1eU describes the ability of the laminate to absorb and dissipate impact energy without breaking.

On the basis of the above-described and constantly performed analyses of the composite materials, the creation of a Diels-Alder-based fiber composite material which can compete with conventional epoxy-based fiber composite materials as regards mechanical, thermal and optical properties is attempted.

TABLE 1

Elasticity modulus of various laminates from 9 prepregs (2 mm thickness) based on furfuryl-maleimide.

| Composition | Mixture [equivalents] | E modulus directly after pressing [MPa] | E modulus after 1 hr at 150° C. [MPa] | Fiber content [Vol. %] |
|---|---|---|---|---|
| Preliminary stage 2 (TMD-BMI) | 1.0/1.0 | 19,900 | 16,700 | 44 |

TABLE 1-continued

Elasticity modulus of various laminates from 9 prepregs
(2 mm thickness) based on furfuryl-maleimide.

| Composition | Mixture [equivalents] | E modulus directly after pressing [MPa] | E modulus after 1 hr at 150° C. [MPa] | Fiber content [Vol. %] |
|---|---|---|---|---|
| Preliminary stage 2 Preliminary stage 4 (TMD-BMI) | 0.85/0.15/1.0 | 19,800 | 17,800 | 40 |
| Preliminary stage 2 Preliminary stage 4 (TMD-BMI) | 0.7/0.3/1.0 | 20,900 | 20,000 | 44 |
| Preliminary stage 1 Preliminary stage 3 (TMD-BMI) | 0.98/0.02/1.0 | 14,600 | 11,000 | 36 |

(Tensile test as per DIN EN ISO 527); determination of E modulus from tensile test

TABLE 2

Shear strength of various laminates from 9 prepregs
(2 mm thickness) based on furfuryl-maleimide.

| Composition | Mixture [equivalents] | Interlaminar shear strength [MPa] | E modulus after 1 hr at 150° C. [MPa] | Fiber content [Vol. %] |
|---|---|---|---|---|
| Preliminary stage 2 (TMD-BMI) | 1.0/1.0 | 23.6 | 43.4 | 37 |
| Preliminary stage 2 Preliminary stage 4 (TMD-BMI) | 0.85/0.15/1.0 | 22.3 | 23.9 | 45 |
| Preliminary stage 2 Preliminary stage 4 (TMD-BMI) | 0.7/0.3/1.0 | 11.4 | 14.2 | 43 |

Determination of E modulus from tensile test; apparent interlaminar shear strength by the three point method with short bars as per DIN EN ISO 14130)

In summary, the mere producibility of a laminate which is storable and shear-stable between the prepreg layers is a direct proof of the reversibility of the crosslinking, since opening up of the crosslinked structure is necessary for this.

TABLE 3

Mechanical properties of the laminates from 14 prepregs
(2 mm) based on polyacrylate-furfuryl/bismaleimide.

| Composition | Mixture [equivalents] | E modulus [MPa] | Interlaminar shear strength [MPa] | Impact resistance [%] | Fiber content [Vol. %] | $T_g$ of matrix [° C.] | $T_g$ of uncrosslinked resin [° C.] |
|---|---|---|---|---|---|---|---|
| Preliminary stage 6a (6.55 wt. %) (TMD-BMI) | 1.0/1.0 | 22,700 | 22.1 | 58.4 | 54 | 58 | 43 |
| Preliminary stage 6b (13.1 wt. %) (TMD-BMI) | 1.0/1.0 | 21,500 | 33.4 | 96.0 | 49 | 68 | 43 |
| Preliminary stage 6b (13.1 wt. %) (TMD-BMI)[1] | 1.0/1.0 | 19,700 | 35.2 | 118.4 | 46 | 61 | 43 |

[1]thermal aftertreatment of the composite for 7 hrs at 80° C. in the drying cabinet Apparent interlaminar shear strength by the three point method with short bars as per DIN EN ISO 14130; impact resistance as per Charpy DIN EN ISO 179-1/1eU; tensile test as per DIN EN ISO 527

A marked elevation of the Tg of the matrix material through the crosslinking of the material is also a proof of the crosslinking of the matrix.

The invention claimed is:

1. A kit, comprising:
   A) a fibrous carrier;
   B) a first reactive component, having at least two dienophilic double bonds, wherein the dienophilic double bonds are carbon-sulfur double bonds; and
   C) a second reactive component having at least two diene functionalities,
   wherein the first reactive component, the second reactive component, or both, has more than two of the respective functionalities, and the first and the second reactive components are crosslinkable to one another by means of a Diels-Alder or a hetero Diels-Alder reaction.

2. The kit of claim 1, wherein the fibrous carrier comprises glass, carbon, plastics, natural fibers or mineral fiber materials wherein the fibers are present as textile surface structures of fleece, knitted goods, knitted and crocheted goods, non-meshed skeins, nonwovens or braids, or as long fiber or short fiber materials.

3. The kit of claim 1, wherein the dienophilic double bonds are groups having structure

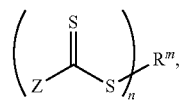

wherein Z is a 2-pyridyl group, a phosphoryl group or a sulfonyl group,
$R^m$ is a multivalent organic group or a polymer and
n is a number between 2 and 20.

4. The kit of claim 1, wherein the fibrous carrier, the first reactive component, or both, are a polymer.

5. The kit of claim 4, wherein the polymer is at least one member selected from the group consisting of a polyacrylate; a polymethacrylate; a polystyrene; a copolymer of an acrylate, a methacrylate, a styrene, or a combination thereof; polyacrylonitrile; a polyether; a polyester; a polylactic acid; a polyamide; a polyester amide; a polyurethane; a polycarbonate; an amorphous or partially crystalline poly-a-olefin; EPDM; EPM; a hydrogenated or non-hydrogenated polybutadiene; ABS; SBR; a polysiloxane block, comb or star copolymer; and a hyperbranched copolymer of these polymers.

6. A composite material or semifinished product, obtained by employing the kit of claim 1.

7. A process for producing a composite semifinished article with the kit of claim 1, the process comprising in the following order:
optionally molding the fibrous carrier;
producing a reactive composition comprising the first and second reactive components to obtain a composition;
directly impregnating the fibrous carrier with the composition;
curing the composition at a crosslinking temperature $T_1$;
heating to a decrosslinking temperature $T_2$;
renewed molding; and
renewed curing the composition at the crosslinking temperature $T_1$ to obtain a composite semifinished article.

8. The process of claim 7, wherein the crosslinking temperature $T_1$ of the crosslinking is between 0 and 60° C.

9. The process of claim 7, wherein
the crosslinking in the curing and renewed curing takes place at crosslinking sites at room temperature,
in the heating at the decrosslinking temperature $T_2$ the crosslinking sites are at least 50% released again by means of a retro Diels-Alder or a retro hetero Diels-Alder reaction, and
the decrosslinking temperature $T_2$ is between 50 and 150° C. above the crosslinking temperature $T1$.

10. The process of claim 7, wherein the crosslinking in the curing after mixing of the first and second reactive components in the producing takes place at room temperature within 2 minutes, and the impregnating is performed at the latest 30 seconds after the producing.

11. The process of claim 7, wherein the producing is performed at a temperature $T_3$ which is at least 40° C. above the crosslinking temperature $T_1$, and the curing is effected by cooling to the crosslinking temperature $T_1$.

12. The process of claim 7, wherein the process of heating to renewed curing are repeated.

13. The process of claim 7, further comprising producing a molded article from the composite semifinished article by subjecting the article to at least one selected from the group consisting of cutting to shape, milling, polishing, painting, and coating.

14. The process of claim 7, further comprising recycling the composite semifinished article at a temperature $T_4$, wherein the temperature $T_4$ is at least as high as the decrosslinking temperature $T_2$.

15. A composite semifinished article obtained by the process of claim 7, wherein the article is suitable for producing composites in boat and ship-building, in aerospace technology, in automobile manufacture, for two-wheeled vehicles, in the automotive construction, medical engineering, sport, electrical and electronics industry fields, and power generation units.

16. The kit of claim 1, wherein the first and second reactive components are crosslinkable to one another by a hetero Diels-Alder reaction.

17. The kit of claim 1, wherein the first reactive component has more than two of the respective functionalities.

18. The kit of claim 1, wherein the second reactive component has more than two of the respective functionalities.

19. The kit of claim 1, wherein both the first and the second reactive components have more than two of the respective functionalities.

20. The process of claim 7, wherein the crosslinking temperature $T_1$ of the crosslinking is between 10 and 40° C.

* * * * *